United States Patent [19]

Johannesen et al.

[11] Patent Number: 4,928,543
[45] Date of Patent: May 29, 1990

[54] ELECTRICALLY OPERATED DRUM BRAKE

[75] Inventors: Donald D. Johannesen, South Bend, Ind.; Alistair G. Taig, Edwardsburg, Mich.

[73] Assignee: Allied-Signal Inc., Morristown, N.J.

[21] Appl. No.: 347,134

[22] Filed: May 4, 1989

Related U.S. Application Data

[62] Division of Ser. No. 183,128, Apr. 19, 1988, Pat. No. 4,850,459.

[51] Int. Cl.⁵ .................... F16H 13/04; F16H 13/08
[52] U.S. Cl. .................................. 475/196; 188/156; 475/149
[58] Field of Search ................ 74/206, 216, 772, 798; 188/72.1, 156, 162; 384/125

[56] References Cited

U.S. PATENT DOCUMENTS

| Re. 18,175 | 9/1931  | Erban         | 74/798   |
|------------|---------|---------------|----------|
| 1,399,443  | 12/1921 | Rennerfelt    | 74/798   |
| 2,101,594  | 12/1937 | Pensbee       | 74/798   |
| 2,839,952  | 6/1958  | Ondeck        | 74/772   |
| 4,435,998  | 3/1984  | Kinoshita     | 74/798   |
| 4,617,838  | 10/1986 | Anderson      | 74/798   |
| 4,643,047  | 2/1987  | Distin et al. | 74/798 X |

FOREIGN PATENT DOCUMENTS 391298  10/1908  France .................... 74/772

Primary Examiner—Allan D. Herrmann
Assistant Examiner—Janice E. Chartoff
Attorney, Agent, or Firm—Larry J. Palguta; Ken C. Decker

[57] ABSTRACT

The electrically operated drum brake (10) comprises an electric motor assembly (80, 180) disposed between opposing ends (62, 72) of two brake shoes (12, 14), the electric motor assembly (80, 180) replacing both the hydraulic wheel cylinder and the parking brake strut and lever. The electric motor assembly (80, 180) comprises a housing (82, 182) having an interior opening (84, 184) in which is disposed an electric motor (86, 186). The electric motor (86) drive a planetary gear assembly (91) which operates a screw mechanism (102) that engages an end (72) of an adjacent brake shoe (14), the housing (82) engaging the other brake shoe (12). An alternative embodiment includes an electric motor (186) which drives a bearing drive member (198), the bearing drive member (198) having a bearing track (200) which receives a plurality of bearing balls (205). The bearing balls (205) engage a fixed bearing track (187) on the housing (182) and also a curved surface (202) on a rotatable bearing member (201). The rotatable bearing member (201) engages a screw mechanism (204) so that when rotation of the bearing balls (205) causes rotation of the rotatable bearing member (201), the screw mechanism (204) is displaced against a brake shoe (14) and, by reaction, the housing (182) is displaced against the other brake shoe (12).

17 Claims, 3 Drawing Sheets

ELECTRICALLY OPERATED DRUM BRAKE

This is a divisional of co-pending application Ser. No. 07/183,128 filed on Apr. 19 1988 now U.S. Pat. No. 4,850,459.

This invention relates generally to a drum brake that may be operated by an electric motor assembly.

Drum brakes have been utilized for many years in passenger cars, heavy-duty trucks, and various other vehicles. Because of the increasing emphasis on reducing the weight of vehicles and simplifying the components thereof, it is desirable to develop a braking system that is operated electrically. Such a braking system must be highly reliable, cost effective, and practical within the packaging constraints of the particular vehicle. The present invention provides a drum brake that may be operated solely by means of an electrically operated motor for both service brake operation and for parking brake operation. Because the electric motor is controlled via a controller mechanism, the usual adjusting mechanisms that compensate for brake pad wear are no longer necessary, this function being accomplished by the control mechanism. The control mechanism receives feedback indicative of the braking force, and appropriate operating functions can be included within the control mechanism in order to ensure that the electric motor effects a proper backing off of the brake pads so that a running clearance is effected. The result is a highly reliable low-cost, electrically operated drum brake which will fit readily within the packaging constraints of several vehicles.

The present invention comprises a drum brake that may be operated by motor means, the drum brake having a pair of oppositely disposed brake shoes including oppositely disposed brake shoe ends, a motor means housing disposed between one pair of brake shoe ends and including the motor means at one end of the housing, the motor means attached to a planetary gear assembly disposed within the housing, the planetary gear assembly comprising planetary gears and a pair of ring gears, one ring gear fixed to the housing and the other ring gear rotatable by said planetary gears, the other ring gear engaging screw means which is connected with one shoe end of said pair of brake shoe ends, the one end of the housing engaging the other shoe end of the pair brake shoe ends so that operation of said motor means causes displacement of the screw means against said one shoe end and, by reaction, displacement of said housing against the other shoe end. Alternatively, the present invention may comprise a drum brake operated by motor means having a motor shaft which rotates a bearing drive member that drives bearings which effect rotation of a rotatable bearing member that operates the screw means.

The invention is described in detail below in reference to the drawings which illustrate embodiments in which.

Figure 1:
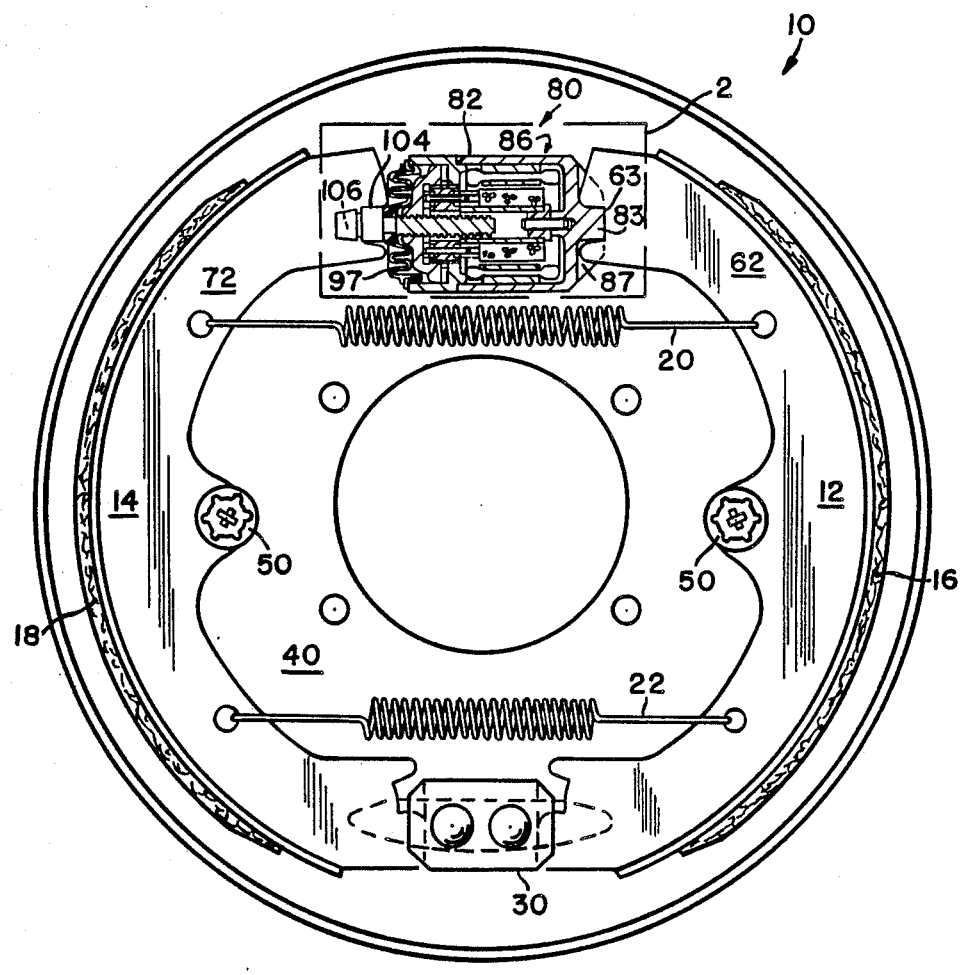
FIG. 1 is a section view of a drum brake containing the electric motor assembly of the present invention.
Figure 2:
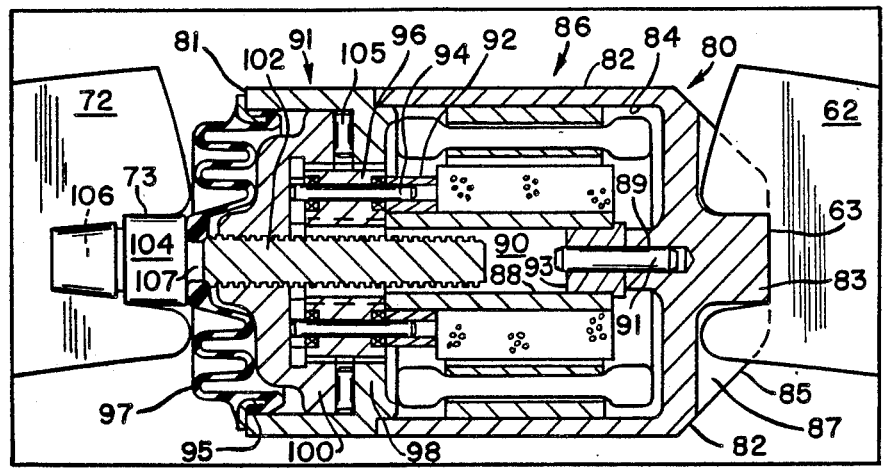
FIG. 2 is an enlarged section view of the motor assembly of FIG. 1.

The drum brake of the present invention is referenced generally by numeral 10 in FIG. 1. Drum brake 10 includes a pair of brake shoes 12 and 14 which include friction pads 16 and 18. The brake shoes are resiliently biased towards one another by means of springs 20 and 22. Although drum brake 10 is a non-servo brake which utilizes fixed anchor 30, it should be clearly understood that the electrically operated drum brake of the present invention can be utilized equally well within a servo brake. In a servo brake, it would be necessary to mount the motor housing appropriately so that the motor could cause a spreading apart of the adjacent ends of the brake shoes. Drum brake 10 includes a backing plate 40 which, through resilient mounting mechanisms 50, supports brake shoes 12, 14. Brake shoes 12 and 14 include oppositely disposed brake shoe ends 62 and 72 which have the electric motor assembly 80 disposed therebetween. As illustrated in FIGS. 1 and 2, electric motor assembly 80 is positioned between and supported by the ends of the brake shoes so that the housing of assembly 80 may move therewith. Electric motor assembly 80 comprises a housing 82 having an interior opening 84 receiving therein the electric motor indicated generally by reference numeral 86. Electric motor 86 includes a motor shaft 88 having a bore 90. Shaft 88 engages a carrier member or ring 92 which receives rotatably a plurality of carrier pins 94 which support planetary gears 96 of a planetary gear assembly indicated generally by reference numeral 91. The planetary gears engage teeth of a fixed ring gear 98 and also the teeth of a rotatable ring gear 100. Disposed between fixed ring member 98 and rotatable ring member 100 are thrust bearings 105. Fixed ring gear 98 comprises a housing part that partially encloses interior opening 84. The planetary gear assembly 90 is similar to planetary gear assemblies disclosed within copending patent application Ser. No. 946,400 entitled *Electrically Operated Disc Brake*, now U.S. Pat. No. 4,793,447 assigned to the same assignee, and incorporated by reference herein. Copending patent application Ser. No. 105,756 entitled *Electrically Actuated Disc Brake* now U.S. Pat. No. 4,850,457 and incorporated by reference herein, discloses a planetary gear assembly for an electrically operated disc brake wherein a ball bearing actuation construction is utilized for the disc brake assembly. Rotatable ring gear 100 is disposed about screw means 102. Screw means 102 includes an end member 104 received within a complementary shaped recess 73 of shoe end 72. Likewise, housing 82 includes a housing extension 83 received within a complementary shaped recess 63 of shoe end 62. Housing 82 further includes a pair of lateral extensions 85 which include therebetween a slot 87. Lateral extensions 85 extend about the end 62 of brake shoe 12 in order to position axially and nonrotatably housing 82 relative to shoe 12. Likewise, the screw end 104 includes a slot 106 which receives the shoe end 72 so as to position axially and nonrotatably screw 102 relative to shoe 14. Screw 102 extends laterally within electric motor 86 to extend within bore 90 of shaft 88. Housing 82 further includes a recess 89 which receives an axle rod 91 that extends into bore 90 and receives thereon a journal bearing member 93. Journal bearing member 93 is received within bore 90 of shaft 88 in order to support motor 86 relative to housing 82. An opening 95 is disposed at housing end 81, opening 95 being closed by a flexible seal mechanism 97 which is received in a groove 107 of screw means 102. Flexible seal mechanism 97 prevents contaminants from entering into interior opening 84 of housing 82.

Drum brake 10 operates in accordance with electrical signals received from a control mechanism (not shown). Typically, the brake pedal of the vehicle would transmit a signal to the control mechanism, which would then send a corresponding signal to the electric motor assembly 80 disposed in each drum brake of the vehicle. The electrical signal is received by electric motor 80, which operates and causes rotation of shaft 88 which effects rotation of carrier member 92 and carrier pins 94. As carrier member 92 and pins 94 rotate, the planetary gears are caused to rotate and, because of a tooth differential that exists between fixed ring gear 98 and rotatable ring gear 100, rotatable ring gear 100 rotates and effects axial displacement of screw means 102. Screw means 102 is displaced to the left of FIG. 1 and causes brake shoe end 72 to move radially outwardly relative to the brake. The axial displacement of screw means 102 causes, by reaction, housing extension 83 to push against shoe end 62 of shoe 12 and push shoe 12 radially outwardly into engagement with the drum of the drum brake.

The electrical signals transmitted to electric motor assembly 80 can effect operation in either direction whereby screw means 102 is either extended or retracted, and thus causing a similar reaction between the housing end 83 and brake shoe end 62. Electric motor assembly 80 can be utilized to effect service brake operation of the drum brake as well as parking brake operation of the drum brake. As explained above, because the control mechanism (not shown) operates in accordance with feedback signals indicative of the braking force being effected by brake shoes 12 and 14, the control mechanism can effect the appropriate operational function to ensure that once a braking application has ceased, an appropriate signal is sent to electric motor assembly 80 in order to effect a proper backing off of shoes 12 and 14 from the drum so that a running clearance is effected. Thus, the motor 80 not only supplies service brake operation for drum brake 10, but eliminates the previously required adjuster assembly and the parking brake lever and strut. Electric motor assembly 80 accomplishes all of the operational functions of service brake application, parking brake application, and brake lining wear adjustment in order to effect a running clearance. The result is a highly reliable, low-cost electrically operated drum brake which is easily manufactured and assembled and which will fit readily within the packaging constraints of several vehicles.

Figure 3:
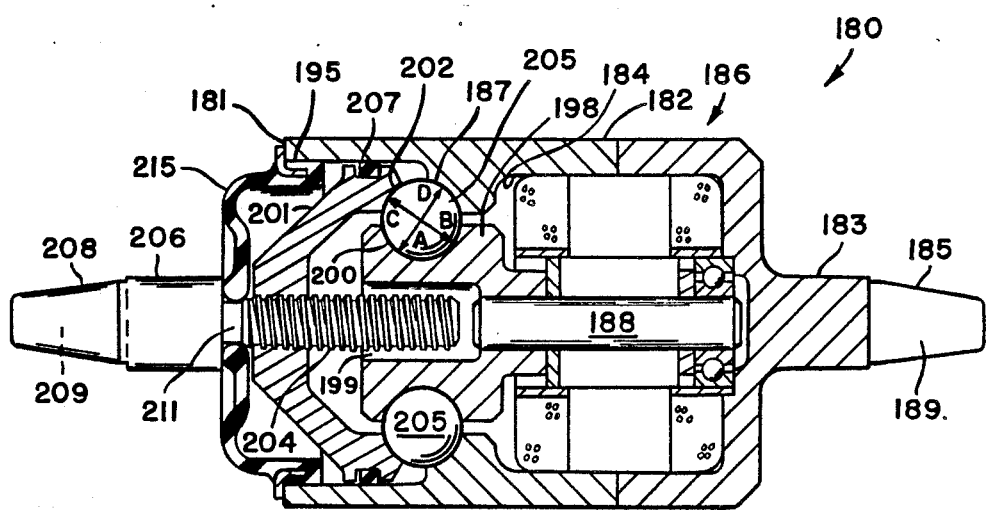
FIG. 3 is an enlarged section view of an alternative motor assembly that may be utilized in the drum brake of FIG. 1.

FIG. 3 illustrates an alternative embodiment of an electrically operated motor for an electrically operated drum brake. The drum brake 10 may include an electrically operated motor assembly 180 which includes a housing 182 that has a housing extension 183 extending into a pair of arms 185 with a slot 189 therebetween. The housing includes an interior opening 184 receiving the electric motor assembly 180. Electric motor assembly 180 includes an electric motor 186 with a shaft 188 that extends into a bearing drive member 198. Bearing drive member 198 includes a bore 199 and an annular gothic arch bearing track 200. The gothic arch annulus or track 200 establishes two contact points A and B with the ball 205. The housing includes a fixed bearing track 187 which contains the same radius of curvature as the annular bearing track 200. Disposed within opening 195 of housing end 181 is a rotatable bearing member 201 which includes a surface 202 having the same radius of curvature as track 200 but having a smaller toroidal radius than the toroidal radius of fixed bearing track 187. Bearing means or bearing balls 205 are disposed between fixed bearing track 187, rotatable bearing member surface 202, and bearing track 200. The bearing drive member 198, track 200, bearing balls 205, fixed bearing track 187, rotatable bearing member 201, and rotatable bearing member surface 202 comprise a traction roller drive mechanism. The rotatable bearing member 201 includes thereabout a flexible bearing member 207 which is disposed within a recess of rotatable bearing member 201. Rotatable bearing member 201 includes threads that engage the threads of output means or screw means 204 which extends into an engagement member 206. Engagement member 206 includes a pair of lateral arms 208 having therebetween a slot 209 which receives the web of the adjacent brake shoe end. The opening 195 of housing end 181 is enclosed by a flexible seal means 215 that extends between housing end 181 and a groove 211 of screw means 204 in order to keep contaminants from entering into interior opening 184 of housing 182. Screw means 204 extends within bore 199 of bearing drive member 198.

Figure 3A:
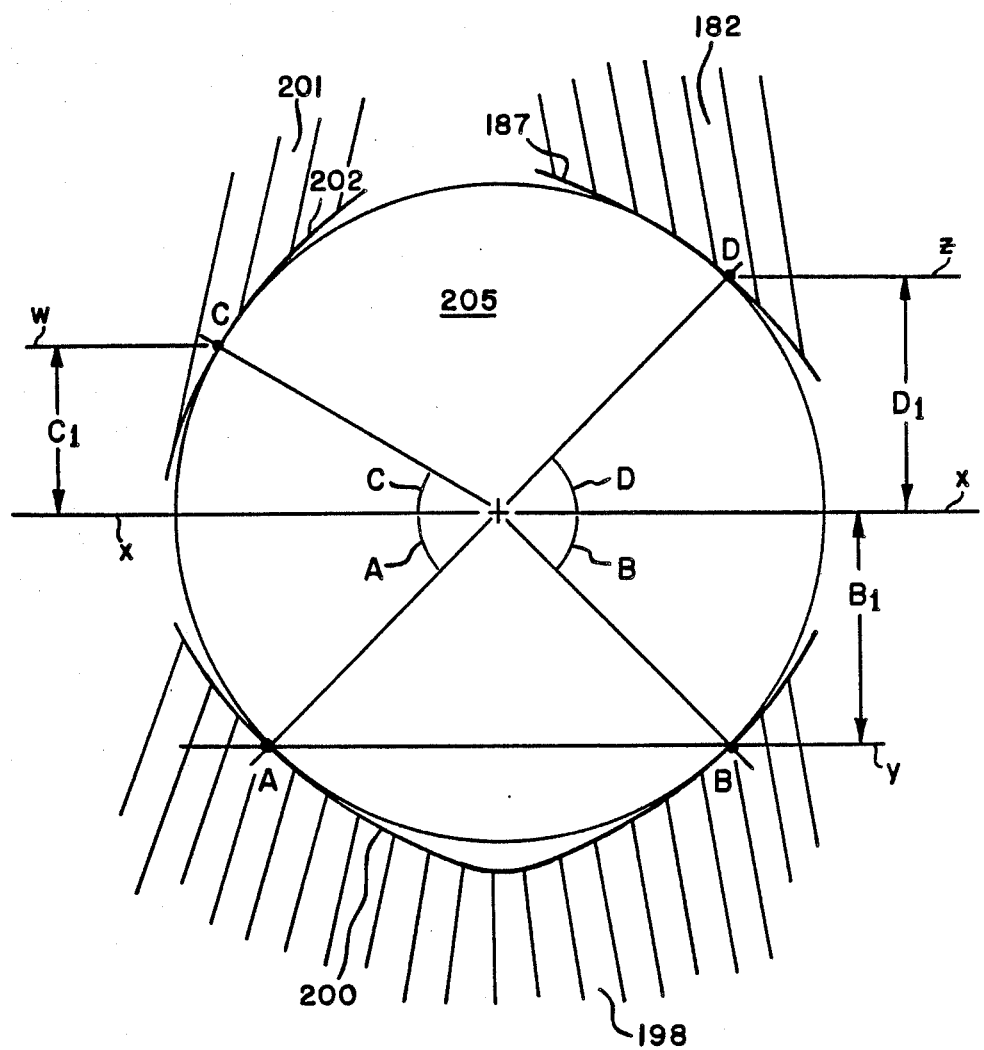
FIG. 3A is an enlarged partial view of FIG. 3.

The electric motor assembly 180 operates generally as described above in that it receives electrical signals from the control mechanism (not shown) which effect operation of electric motor 186 which rotates bearing drive member 198. As bearing drive member 198 rotates, the bearing balls 205 cause rotation of rotatable bearing member 201. The rotation of rotatable bearing member 201 is determined by the different contact distances relative to the contact points "C" (between rotatable bearing member 201 and bearing balls 205) and "D" (between fixed bearing track 187 and bearing balls 205). The rotation of bearing balls 205 is determined by an axis x of ball rotation that is parallel to a line y extending through contact points "A" and "B", the axis x also being mid way between the line Y and a parallel line Z through contact point "D" (see FIG. 3A). In other words, the distance $B_1$ from line Y to axis X equals the distance $D_1$ from parallel line Z to axis X. As shown in FIG. 3A, the distance $C_1$ between parallel line W and axis X is less than the distance $D_1$. This difference results from angle C being less than angle D. Thus, the contact distance spanning between contact points A and D is greater than the distance spanning between contact points B and C, as generally illustrated in FIG. 3. The result is that the rotation of bearing drive member 198 by motor 186 causes rotation of a bearing balls 205 which effects a motor torque amplification or rotation of rotatable bearing member 201. Traction fluids such as Monsanto Santotrac® lubricates may be used to enhance the tractive effort required for the device to function with minimum slippage and maximum efficiency. As rotatable bearing member 201 rotates, screw means 204 is displaced laterally and, by reaction, the housing extension 183 is displaced laterally against the adjacent brake shoe end. The lateral displacement of screw means 104 and housing end 183 causes a spreading apart radially of brake shoes 12 and 14 so that the brake shoes engage the rotating drum of the drum brake. As described above, the control mechanism can effect a service brake application, a parking brake application, and an appropriate retraction of the brake shoes from the drum so that a running clearance is effected between the friction pads and adjacent surface of the drum. Motor assembly 180 enables the elimination of the parking brake strut and parking brake lever, in addition to the elimination of any adjustment mechanism needed previously to adjust the distance of the brake shoes relative to the drum in order to effect a proper "running clearance".

Although the present invention has been illustrated and described in connection with example embodiments, it will be understood that this is illustrative of the invention, and is by no means restrictive, thereof. It is reasonably to be expected that those skilled in the art can make numerous revisions and additions to the invention and it is intended that such revisions and additions will be included in the scope of the following claims as equivalents of the invention.

We claim:

1. A traction roller drive that may be operated by motor means, comprising a housing for said roller drive, the motor means connected with a bearing drive member, the bearing drive member engaging rotatably bearing means, the bearing means in bearing engagement with a portion at said housing and a rotatable bearing member, the rotatable bearing member engaging output means and including about a periphery thereof a flexible bearing member which engages an interior surface of said housing, a first end of the housing being disposed oppositely from said output means, actuation of said motor means effecting operation of said output means so that the bearing means absorbs loading exerted upon the output means, and the bearing drive member including a curved track receiving the bearing means, a contact distance extendinq between said curved track and said portion which comprises a curved surface being different from a contact distance extending between said curved track and said rotatable bearing member so that rotation of said bearing means causes rotation of said rotatable bearing member.

2. The traction roller drive in accordance with claim 1, wherein the bearing drive member includes a bore which receives therein a portion of said output means.

3. The traction roller drive in accordance with claim 2, wherein the first end of the housing includes an extension which receives thereat an end of an associated brake shoe.

4. The traction roller drive in accordance with claim 3, wherein the bearing means comprises a plurality of ball bearings, the curved track comprises a curved surface disposed opposite from the curved surface of the housing and a curved surface of the rotatable bearing member, the curved surface of the rotatable bearing member having a toroidal radius different from the toroidal radius of the curved surface of said housing.

5. The traction roller drive in accordance with claim 4, wherein the motor means includes a shaft which is received at said bearing drive member.

6. The traction roller drive in accordance with claim 1, wherein the operation of the output means causes, by reaction, displacement of the first end.

7. A traction roller drive that may be operated by motor means, comprising a housing for said roller drive, the motor means connected with a bearing drive member, the bearing drive member engaging rotatably bearing means, the bearing means in bearing engagement with a portion of said housing and a rotatable bearing member, the rotatable bearing membrane engaging output means, and a first end of the housing being disposed oppositely from said output means, actuation of said motor means effecting operation of said output means so that the bearing means absorbs loading exerted upon the output means, wherein the operation of the output means causes, by reaction, displacement of the first end.

8. The traction roller drive in accordance with claim 7, wherein the bearing drive member includes a curved track receiving the bearing means, a contact distance extending between said curved track and said portion which comprises a curved surface being different from a contact distance extending between said curved track and said rotatable bearing member so that rotation of said bearing means causes rotation of said rotatable bearing member.

9. The traction roller drive in accordance with claim 7, wherein the rotatable bearing member includes about a periphery thereof a flexible bearing member which engages an interior surface of said housing.

10. The traction roller drive in accordance with claim 7, wherein the bearing drive member includes a bore which receives therein a portion of said output means.

11. The traction roller drive in accordance with claim 7, wherein the first end of the housing includes an extension which receives thereat an end of an associated brake shoe.

12. The traction roller drive in accordance with claim 8, wherein the bearing means comprises a plurality of ball bearings, the curved track comprises a curved surface disposed opposite from the curved surface of the housing and a curved surface of the rotatable bearing member, the curved surface of the rotatable bearing member having a toroidal radius different from a toroidal radius of the curved surface of said housing.

13. The traction roller drive in accordance with claim 7, wherein the motor means includes a shaft which is received at said bearing drive member.

14. A traction roller drive that may be operated by motor means, comprising a housing for said roller drive, the motor means connected with a bearing drive member, the bearing drive member engaging rotatably bearing means, the bearing means in bearing engagement with a portion at said housing and a rotatable bearing member, the rotatable bearing member engaging output means and including about a periphery thereof a flexible bearing member which engages an interior surface of said housing, and a first end of the housing being disposed oppositely from said output means, actuation of said motor means effecting operation of said output means so that the bearing means absorbs loading exerted upon the output means.

15. The traction roller drive in accordance with claim 14, wherein the bearing drive member includes a bore which receives therein a portion of said output means.

16. The traction roller drive in accordance with claim 14, wherein the first end of the housing includes an extension which receives thereat an end of an associated brake shoe.

17. The traction roller drive in accordance with claim 14, wherein the motor means includes a shaft which is received at said bearing drive member.

* * * * *